(12) United States Patent
Miller et al.

(10) Patent No.: US 7,770,184 B2
(45) Date of Patent: Aug. 3, 2010

(54) INTEGRATED TRADING PLATFORM ARCHITECTURE

(75) Inventors: Lawrence R. Miller, New York, NY (US); James A. Lempenau, Hoboken, NJ (US); Leonid Shtivelman, Brooklyn, NY (US); William T. Deans, Allentown, PA (US); Marc Le Gelebart, New York, NY (US); Andrew J. Peterson, Weehawken, NJ (US)

(73) Assignee: JP Morgan Chase Bank, New York, NY (US)

( * ) Notice: Subject to any disclaimer, the term of this patent is extended or adjusted under 35 U.S.C. 154(b) by 1523 days.

(21) Appl. No.: 10/851,923

(22) Filed: May 21, 2004

(65) Prior Publication Data

US 2005/0188378 A1    Aug. 25, 2005

Related U.S. Application Data

(60) Provisional application No. 60/476,416, filed on Jun. 6, 2003.

(51) Int. Cl.
  *G06F 9/46*  (2006.01)
  *G06F 15/16*  (2006.01)

(52) U.S. Cl. ....................... 719/320; 709/230

(58) Field of Classification Search ................... 719/320
  See application file for complete search history.

(56) References Cited

U.S. PATENT DOCUMENTS

| | | | |
|---|---|---|---|
| 4,169,285 A | 9/1979 | Walker | |
| 4,648,038 A | 3/1987 | Roberts et al. | |
| 4,739,478 A | 4/1988 | Roberts et al. | |
| 4,742,457 A | 5/1988 | Leon et al. | |
| 4,752,877 A | 6/1988 | Roberts et al. | |
| 4,933,842 A | 6/1990 | Durbin et al. | |
| 5,121,469 A | 6/1992 | Richards et al. | |
| 5,222,019 A | 6/1993 | Yoshino et al. | |
| 5,257,369 A | 10/1993 | Skeen et al. | |
| 5,270,922 A | 12/1993 | Higgins | |
| 5,297,031 A | 3/1994 | Gutterman et al. | |
| 5,297,032 A | 3/1994 | Trojan et al. | |
| 5,305,200 A | 4/1994 | Hartheimer et al. | |
| 5,419,890 A | 5/1995 | Saidi | |
| 5,454,104 A | 9/1995 | Steidlmayer et al. | |

(Continued)

FOREIGN PATENT DOCUMENTS

WO    98/43170    10/1998

(Continued)

OTHER PUBLICATIONS

Jepsen, T., "SOAP cleans up interoperability problems on the Web", IT Professional, pp. 52-55, vol. 3, Issue 1, Jan./Feb. 2001.

(Continued)

*Primary Examiner*—Hyung S Sough
*Assistant Examiner*—Abdou K Seye
(74) *Attorney, Agent, or Firm*—Lowenstein Sandler PC

(57) ABSTRACT

A system and method that provides a JPeX client that opens up a socket on which it listens for connections from the local host. External applications on the desktop are able to connect to the server socket in the client and use XML to execute commands on the client.

10 Claims, 11 Drawing Sheets

```
///Blah blah...
} else if ( a_req.getPathInfo().endsWith("JPeXLinkApplet_JPEXClient.cab") ) {
    if ( FbServletUtilities.getPersistantBooleanValue("jar",a_req,a_res) ) {
        strLibrary = "_JPEXClient.cab";
    } else {
        strLibrary = "_JPEXLinkApplet.cab";
    }
}
///Blah blah...
```

U.S. PATENT DOCUMENTS

| | | | |
|---|---|---|---|
| 5,462,438 | A | 10/1995 | Becker et al. |
| 5,497,317 | A | 3/1996 | Hawkins et al. |
| 5,517,406 | A | 5/1996 | Harris et al. |
| 5,557,798 | A | 9/1996 | Skeen et al. |
| 5,563,783 | A | 10/1996 | Stolfo et al. |
| 5,592,379 | A | 1/1997 | Finfrock et al. |
| 5,649,186 | A | 7/1997 | Ferguson |
| 5,675,746 | A | 10/1997 | Marshall |
| 5,706,502 | A | 1/1998 | Foley et al. ............... 395/610 |
| 5,710,889 | A | 1/1998 | Clark et al. |
| 5,724,593 | A | 3/1998 | Hargrave, III et al. |
| 5,778,157 | A | 7/1998 | Oatman et al. |
| 5,787,402 | A | 7/1998 | Potter et al. |
| 5,806,047 | A | 9/1998 | Hackel et al. |
| 5,806,048 | A | 9/1998 | Kiron et al. |
| 5,819,273 | A | 10/1998 | Vora et al. |
| 5,832,461 | A | 11/1998 | Leon et al. |
| 5,845,266 | A | 12/1998 | Lupien et al. |
| 5,864,827 | A | 1/1999 | Wilson |
| 5,880,725 | A | 3/1999 | Southgate |
| 5,890,140 | A | 3/1999 | Clark et al. |
| 5,913,214 | A | 6/1999 | Madnick et al. |
| 5,918,218 | A | 6/1999 | Harris et al. |
| 5,922,044 | A | 7/1999 | Banthia |
| 5,926,792 | A | 7/1999 | Koppes et al. |
| 5,940,810 | A | 8/1999 | Traub et al. |
| 5,944,784 | A | 8/1999 | Simonoff et al. |
| 5,946,667 | A | 8/1999 | Tull, Jr. et al. |
| 5,950,176 | A | 9/1999 | Keiser et al. |
| 5,966,531 | A | 10/1999 | Skeen et al. |
| 5,966,672 | A | 10/1999 | Knupp |
| 5,970,479 | A | 10/1999 | Shepherd |
| 5,986,673 | A | 11/1999 | Martz |
| 5,995,943 | A | 11/1999 | Bull et al. |
| 6,006,206 | A | 12/1999 | Smith et al. |
| 6,012,046 | A | 1/2000 | Lupien et al. |
| 6,018,714 | A | 1/2000 | Risen, Jr. |
| 6,018,721 | A | 1/2000 | Aziz et al. |
| 6,023,280 | A | 2/2000 | Becker et al. |
| 6,029,146 | A | 2/2000 | Hawkins et al. |
| 6,029,147 | A | 2/2000 | Horadan et al. |
| 6,035,287 | A | 3/2000 | Stallaert et al. |
| 6,049,783 | A | 4/2000 | Segal et al. |
| 6,052,673 | A | 4/2000 | Leon et al. |
| 6,055,522 | A | 4/2000 | Krishna et al. |
| 6,058,378 | A | 5/2000 | Clark et al. |
| 6,061,662 | A | 5/2000 | Makivic |
| 6,064,984 | A | 5/2000 | Ferguson et al. |
| 6,073,104 | A | 6/2000 | Field |
| 6,073,115 | A | 6/2000 | Marshall |
| 6,078,914 | A | 6/2000 | Redfern |
| 6,078,956 | A | 6/2000 | Bryant et al. |
| 6,081,774 | A | 6/2000 | de Hita et al. |
| 6,088,685 | A | 7/2000 | Kiron et al. |
| 6,092,056 | A | 7/2000 | Tull, Jr. et al. |
| 6,105,005 | A | 8/2000 | Fuhrer |
| 6,131,082 | A | 10/2000 | Hargrave, III et al. |
| 6,134,600 | A | 10/2000 | Liu ............... 709/316 |
| 6,148,298 | A | 11/2000 | LaStrange et al. |
| 6,173,270 | B1 | 1/2001 | Cristofich et al. |
| 6,173,276 | B1 | 1/2001 | Kant et al. |
| 6,178,420 | B1 | 1/2001 | Sassano |
| 6,185,567 | B1 | 2/2001 | Ratnaraj et al. |
| 6,195,647 | B1 | 2/2001 | Martyn et al. |
| 6,226,623 | B1 | 5/2001 | Schein et al. |
| 6,233,566 | B1 | 5/2001 | Levine et al. |
| 6,236,972 | B1 | 5/2001 | Shkedy |
| 6,236,977 | B1 | 5/2001 | Verba et al. |
| 6,243,670 | B1 | 6/2001 | Bessho et al. |
| 6,260,021 | B1 | 7/2001 | Wong et al. ............... 705/2 |
| 6,263,321 | B1 | 7/2001 | Daughtery, III |
| 6,263,335 | B1 | 7/2001 | Paik et al. |
| 6,266,683 | B1 | 7/2001 | Yehuda et al. |
| 6,272,474 | B1 | 8/2001 | Garcia |
| 6,275,229 | B1 | 8/2001 | Weiner et al. |
| 6,278,982 | B1 | 8/2001 | Korhammer et al. |
| 6,282,537 | B1 | 8/2001 | Madnick et al. |
| 6,285,986 | B1 | 9/2001 | Andrews |
| 6,285,989 | B1 | 9/2001 | Shoham |
| 6,304,858 | B1 | 10/2001 | Mosler et al. |
| 6,313,854 | B1 | 11/2001 | Gibson |
| 6,317,726 | B1 | 11/2001 | O'Shaughnessy |
| 6,317,728 | B1 | 11/2001 | Kane |
| 6,321,212 | B1 | 11/2001 | Lange |
| 6,323,881 | B1 | 11/2001 | Broulik et al. ............... 345/744 |
| 6,332,163 | B1 | 12/2001 | Bowman-Amuah |
| 6,338,055 | B1 | 1/2002 | Hagmann et al. |
| 6,338,068 | B1 | 1/2002 | Moore et al. |
| 6,343,287 | B1 | 1/2002 | Kumar et al. ............... 707/4 |
| 6,347,307 | B1 | 2/2002 | Sandhu et al. |
| 6,349,291 | B1 | 2/2002 | Varma |
| 6,356,933 | B2 | 3/2002 | Mitchell et al. ............... 709/203 |
| 6,360,210 | B1 | 3/2002 | Wallman |
| 6,366,908 | B1 | 4/2002 | Chong et al. |
| 6,381,585 | B1 | 4/2002 | Maples et al. |
| 6,381,586 | B1 | 4/2002 | Glasserman et al. |
| 6,385,660 | B2 | 5/2002 | Griesemer et al. ............... 709/315 |
| 6,389,413 | B2 | 5/2002 | Takahashi et al. |
| 6,389,452 | B1 | 5/2002 | Glass ............... 709/202 |
| 6,401,080 | B1 | 6/2002 | Bigus et al. |
| 6,408,282 | B1 | 6/2002 | Buist |
| 6,418,417 | B1 | 7/2002 | Corby et al. |
| 6,421,653 | B1 | 7/2002 | May ............... 705/37 |
| 6,424,980 | B1 | 7/2002 | Iizuka et al. |
| 6,429,868 | B1 | 8/2002 | Dehner, Jr. et al. |
| 6,442,545 | B1 | 8/2002 | Feldman et al. |
| 6,446,110 | B1 | 9/2002 | Lection et al. ............... 709/203 |
| 6,457,066 | B1 | 9/2002 | Mein et al. ............... 709/330 |
| 6,460,021 | B1 | 10/2002 | Kirksey |
| 6,480,882 | B1 | 11/2002 | McAdam et al. ............... 709/202 |
| 6,489,954 | B1 | 12/2002 | Powlette |
| 6,490,584 | B2 | 12/2002 | Barrett et al. |
| 6,493,681 | B1 | 12/2002 | Tertitski et al. |
| 6,510,406 | B1 | 1/2003 | Marchisio |
| 6,516,303 | B1 | 2/2003 | Wallman |
| 6,516,308 | B1 | 2/2003 | Cohen |
| 6,523,022 | B1 | 2/2003 | Hobbs |
| 6,556,987 | B1 | 4/2003 | Brown et al. |
| 6,564,250 | B1 | 5/2003 | Nguyen |
| 6,581,056 | B1 | 6/2003 | Rao |
| 6,581,062 | B1 | 6/2003 | Draper et al. |
| 6,598,028 | B1 | 7/2003 | Sullivan et al. |
| 6,601,044 | B1 | 7/2003 | Wallman |
| 6,611,825 | B1 | 8/2003 | Billheimer et al. |
| 6,615,187 | B1 | 9/2003 | Ashenmil et al. |
| 6,615,258 | B1* | 9/2003 | Barry et al. ............... 709/223 |
| 6,629,097 | B1 | 9/2003 | Keith |
| 6,631,373 | B1 | 10/2003 | Otani et al. |
| 6,633,868 | B1 | 10/2003 | Min et al. |
| 7,249,037 | B2 | 7/2007 | Koppes et al. |
| 2001/0011241 | A1 | 8/2001 | Nemzow |
| 2001/0011242 | A1 | 8/2001 | Allex et al. |
| 2001/0018674 | A1 | 8/2001 | Schein et al. |
| 2001/0025264 | A1 | 9/2001 | Deaddio et al. |
| 2001/0032217 | A1 | 10/2001 | Huang |
| 2001/0042034 | A1 | 11/2001 | Elliott |
| 2001/0043235 | A1 | 11/2001 | Best et al. |
| 2001/0044771 | A1 | 11/2001 | Usher et al. ............... 705/37 |
| 2001/0056398 | A1 | 12/2001 | Scheirer |
| 2002/0002530 | A1 | 1/2002 | May |
| 2002/0004777 | A1 | 1/2002 | Foster et al. |
| 2002/0007335 | A1 | 1/2002 | Millard et al. |
| 2002/0007358 | A1 | 1/2002 | Johnson et al. |
| 2002/0013753 | A1 | 1/2002 | Marks de Chabris et al. |

| | | | |
|---|---|---|---|
| 2002/0013862 A1 | 1/2002 | Orchard et al. ............... 709/315 | |
| 2002/0016762 A1 | 2/2002 | Feilbogen et al. | |
| 2002/0016819 A1 | 2/2002 | Sugimoto et al. | |
| 2002/0018077 A1 | 2/2002 | Powlette | |
| 2002/0022956 A1 | 2/2002 | Ukraincsyk et al. | |
| 2002/0023053 A1 | 2/2002 | Szoc et al. | |
| 2002/0026405 A1 | 2/2002 | Haar | |
| 2002/0026449 A1 | 2/2002 | Azencott | |
| 2002/0026462 A1 | 2/2002 | Shotton, Jr. et al. | |
| 2002/0029183 A1 | 3/2002 | Vlahoplus et al. | |
| 2002/0032644 A1 | 3/2002 | Corby et al. | |
| 2002/0035561 A1 | 3/2002 | Archer et al. | |
| 2002/0042767 A1 | 4/2002 | Kwan | |
| 2002/0049666 A1 | 4/2002 | Reuter et al. | |
| 2002/0054115 A1 | 5/2002 | Mack et al. | |
| 2002/0059129 A1 | 5/2002 | Kemp et al. | |
| 2002/0059141 A1 | 5/2002 | Davies et al. | |
| 2002/0065752 A1 | 5/2002 | Lewis | |
| 2002/0065755 A1 | 5/2002 | Shlafman et al. | |
| 2002/0069157 A1 | 6/2002 | Jordan | |
| 2002/0073007 A1 | 6/2002 | Ayache | |
| 2002/0078253 A1 | 6/2002 | Szondy et al. ............... 709/315 | |
| 2002/0087373 A1 | 7/2002 | Dickstein et al. | |
| 2002/0087454 A1 | 7/2002 | Calo et al. | |
| 2002/0087455 A1 | 7/2002 | Tsagarakis et al. | |
| 2002/0087457 A1 | 7/2002 | Madeley et al. | |
| 2002/0099646 A1 | 7/2002 | Agarwal et al. | |
| 2002/0099656 A1 | 7/2002 | Poh Wong | |
| 2002/0112056 A1 | 8/2002 | Baldwin et al. | |
| 2002/0123947 A1 | 9/2002 | Yuste et al. | |
| 2002/0130868 A1 | 9/2002 | Smith | |
| 2002/0138390 A1 | 9/2002 | May | |
| 2002/0147671 A1 | 10/2002 | Sloan et al. | |
| 2002/0152154 A1 | 10/2002 | Rothman et al. | |
| 2002/0152156 A1 | 10/2002 | Tyson-Quah | |
| 2002/0156658 A1 | 10/2002 | Selesny et al. | |
| 2002/0156719 A1 | 10/2002 | Finebaum et al. | |
| 2002/0161692 A1 | 10/2002 | Loh et al. | |
| 2002/0161853 A1 | 10/2002 | Burak et al. | |
| 2002/0169707 A1 | 11/2002 | Koek et al. ............... 705/37 | |
| 2002/0174043 A1 | 11/2002 | Gilbert et al. | |
| 2002/0178096 A1 | 11/2002 | Marshall | |
| 2002/0184132 A1 | 12/2002 | Foster | |
| 2002/0184237 A1 | 12/2002 | McFeely ............... 707/104.1 | |
| 2002/0194097 A1 | 12/2002 | Reitz | |
| 2002/0194114 A1 | 12/2002 | Erdmier | |
| 2003/0004942 A1 | 1/2003 | Bird | |
| 2003/0009411 A1 | 1/2003 | Ram et al. | |
| 2003/0018558 A1 | 1/2003 | Heffner et al. | |
| 2003/0018714 A1 | 1/2003 | Mikhailov et al. ........... 709/203 | |
| 2003/0033212 A1 | 2/2003 | Sandhu et al. | |
| 2003/0037174 A1 | 2/2003 | Lavin et al. ............... 709/313 | |
| 2003/0065594 A1 | 4/2003 | Murphy | |
| 2003/0066025 A1 | 4/2003 | Garner et al. | |
| 2003/0066032 A1 | 4/2003 | Ramachandran et al. | |
| 2003/0078869 A1 | 4/2003 | Williams | |
| 2003/0088496 A1 | 5/2003 | Piotrowski ............... 705/37 | |
| 2003/0093360 A1 | 5/2003 | May | |
| 2003/0093362 A1 | 5/2003 | Tupper et al. ............... 705/37 | |
| 2003/0093565 A1 | 5/2003 | Berger et al. | |
| 2003/0105806 A1* | 6/2003 | Gayle et al. ............... 709/203 | |
| 2003/0105981 A1 | 6/2003 | Miller et al. ............... 713/202 | |
| 2003/0115122 A1 | 6/2003 | Slater et al. | |
| 2003/0126063 A1 | 7/2003 | Reuter | |
| 2003/0126068 A1 | 7/2003 | Hauk et al. | |
| 2003/0126069 A1 | 7/2003 | Cha | |
| 2003/0126117 A1 | 7/2003 | Megiddo et al. | |
| 2003/0140035 A1 | 7/2003 | Burrows | |
| 2003/0149653 A1 | 8/2003 | Penney | |
| 2003/0154071 A1 | 8/2003 | Shreve | |
| 2003/0154158 A1 | 8/2003 | Martyn et al. | |
| 2003/0154306 A1* | 8/2003 | Perry ............... 709/245 | |
| 2003/0158949 A1 | 8/2003 | Miller et al. ............... 709/229 | |
| 2003/0188255 A1 | 10/2003 | Shimizu et al. | |
| 2003/0220861 A1 | 11/2003 | Broms et al. | |
| 2003/0220868 A1 | 11/2003 | May | |
| 2003/0229718 A1* | 12/2003 | Tock et al. ............... 709/246 | |
| 2003/0233459 A1 | 12/2003 | Miller et al. ............... 709/228 | |
| 2003/0236862 A1 | 12/2003 | Miller et al. ............... 709/219 | |
| 2003/0236957 A1 | 12/2003 | Miller et al. ............... 711/163 | |
| 2004/0039692 A1 | 2/2004 | Shields et al. | |
| 2004/0064397 A1 | 4/2004 | Lynn et al. ............... 705/37 | |
| 2004/0068559 A1 | 4/2004 | Shaw | |
| 2004/0078248 A1 | 4/2004 | Altschuler | |
| 2004/0103003 A1 | 5/2004 | Mayers et al. | |
| 2004/0128169 A1 | 7/2004 | Lusen | |
| 2004/0148247 A1 | 7/2004 | Miller et al. ............... 705/37 | |
| 2004/0148259 A1 | 7/2004 | Reiners et al. | |
| 2004/0162775 A1 | 8/2004 | Winklevoss et al. | |
| 2004/0167850 A1 | 8/2004 | Dreyer et al. | |
| 2004/0220885 A1 | 11/2004 | Salzmann et al. | |
| 2004/0225596 A1 | 11/2004 | Kemper et al. | |
| 2005/0060256 A1 | 3/2005 | Peterson et al. | |
| 2005/0086170 A1 | 4/2005 | Rao | |

FOREIGN PATENT DOCUMENTS

| | | |
|---|---|---|
| WO | 01/20530 | 3/2001 |
| WO | 01/37540 | 5/2001 |
| WO | 01/57716 | 8/2001 |
| WO | 01/59670 | 8/2001 |
| WO | 02/03774 | 1/2002 |
| WO | 02/14991 | 2/2002 |
| WO | 02/054189 | 7/2002 |
| WO | 02/056146 | 7/2002 |
| WO | 02/063516 | 8/2002 |
| WO | 02/065278 | 8/2002 |
| WO | 02/065286 | 8/2002 |
| WO | 03/012588 | 2/2003 |
| WO | 03/030013 | 4/2003 |
| WO | 03/032158 | 4/2003 |
| WO | 03/065256 | 8/2003 |
| WO | 03/102733 | 12/2003 |

OTHER PUBLICATIONS

Chester, T.M., "Cross-platform integration with XML and SOAP", IT Professional, pp. 26-34, vol. 3, Issue 5, Sep./Oct. 2001.
Silverman; A New Strategy for Giving Away Your Money, Wall Street Journal, D1, Oct. 6, 2004.
Unknown; Investigating Systems Network; Oct. 21, 2002; www.investing-systems.com/software.html.
Elkayam; Using Indexed Bonds.
Ericson; Softwerc Releases Patent-Pending.
IBM Corp.; Strict Read Order Control for a Queing System; Jan. 28, 2003; Journal IBM TDB; Published Mar. 2002.
Novell, Inc.; Beginning of Viewing Information and Viewing Basic Information About a Print Job.
Hewlett-Packard; X4QUEVIEW.ORG.
Electronic Trading Tools.
Fast Email Extractor 4.4.
Intellseek and Inxight Partner to Provide New Business Intelligence Solutions, www.inxight.com/news/021029_intelliseek.html, Oct. 29, 2002.
Myllymaki; With Standard XML Technologies.
Ribiero-Neto et al.; Top Down Extraction of Semi-Structured Data, String Processing and Information Retrieval Symposium & AMP.
Rupali et al.; Phrase-Based Text Representation for Managing the Web Documents.
May; Modeling and Querying Structure and Contents of the Web, 10th International Workshop on Database & AMP; Expert Systems Applications, Sep. 1, 1999, p. 721.
Manco et al.; A Framework for Adaptive Mail Classification, 14th IEEE Conference on Tools With Artificial Intelligence (ICTAI'02), Nov. 4, 2002, p. 387.
Carchiolo et al.; Structuring the Web.
Lam et al.; Querying Web Data—The WEBQA Approach.

Witten et al.; Text Mining: A New Frontier for Lossless Compression.

Calado; The Web-DL Environment for Building Digital Libraries From the Web.

Czejdo; Automatic Generation Ontology Based Anntations in XML and Their Use in Retrieval Systems, Web Information Systems Engineering, 2000, Proceedings of the First International Conference, Jun. 19, 2000, p. 296.

Roberts; Top Priority on Bottom Line: More Companies Seeting to Manage Business Risks.

Chacko, Cephalon, Inc. Taking Risk Management Gherory Seriously.

Pila; in Case of Emergency; Contingent Capital.

Kus; Contingent Capital: Just in the Capital Management Sets a New Standard; Sponsored Statement.

Rising to the Challenge of Global STP, Euromoney Publications PLC Global Inventor, Nov. 1, 1999, pp. 51-52; ISSN. 0951-3604.

Fan et al.; The Internet and Future Financial Markets; Industry Trend or Event, Association for Computing Machinery, Inc., Sec. 11, vol. 43; Nov. 1, 2000, p. 82; ISSN: 0001-0782.

STP in the Bond Market?, Wall Street & Technology, Dec. 1, 2002, p. 20.

Tradeweb's STP Vision, Euromoney Institutional Investor PLC, Sec. 406, vol. 34, Feb. 1, 2003, p. S6; ISSN: 0014-2433.

Block Trades Market Practice, Apr. 1, 2003, pp. 1-10.

Martin; Email Report, Issue 11, Aug. 16, 2001, Printed Aug. 2, 2005.

Emery, et al.; The Measurement of Liquidity, Journal of Accounting Research, vol. 20, No. 2, Part 1, p. 290-303, Autumn 1982.

Form 10-K, United States Securities and Exchange Commission, No Date, Year Ending Dec. 31, 2003.

Fixprotocol, Financial Information Exchange, Oct. 1998.

White, How Computers Work Fourth Edition, Sep. 1998.

\* cited by examiner

```
<AuthenticationChallenge>
    <TimeStamp
method="System.currentTimeMillis">1054650076734</
TimeStamp><Nonce>eEdc5C7/UEcsA5FA/ppE8kMc4Sw=</Nonce>
</AuthenticationChallenge>
```

FIG. 2

```
<?xml version="1.0" encoding="UTF-8"?>
<SOAP-ENV:Envelope xmlns:SOAP-ENV="http://schemas.xmlsoap.org/soap/envelope/">
    <SOAP-ENV:Header>
        <intent>OpenOrderTicketService</intent>
    </SOAP-ENV:Header>
    <SOAP-ENV:Body>
        <ticket:OpenOrderTicketService      xmlns:ticket="http://jpmorganexpress.jpmorgan.com/ns/fi/outright/ticket/">
            <OrderParams>
                <InstrumentId>PTOTEBOE0012</InstrumentId>
                <InstrumentIdType>ISIN</InstrumentIdType>
                <RequestId>ajpeters_flowbiz28_1054653648765_2</RequestId>
                <RequestType>Order</RequestType>
                <Side>Buy</Side>
                <Timestamp>1054653648765</Timestamp>
                <Validity>Immediate</Validity>
            </OrderParams>
        </ticket:OpenOrderTicketService>
    </SOAP-ENV:Body>
</SOAP-ENV:Envelope>
```

FIG. 4

```
<?xml version="1.0" encoding="UTF-8"?>
<SOAP-ENV:Envelope xmlns:SOAP-ENV="http://schemas.xmlsoap.org/soap/envelope/">
    <SOAP-ENV:Header>
        <AuthenticationSecureData>AAAAAAAAAAAAAAAAAAAAAAY5GGL4AAAJjCAgIDx0aWNrZXQ6T3BIbk9yZGVyVGlja2V0U2
VydmljZSB4bWxuczp0aWNrZXQ9Imh0dHA6Ly9qcG1vcmdhbi5jb20vdGlja2V0L3NlcnZpY2UiPg0KICAgICA8SW5wdXREYXRhMj
RpY2tldC8IPg0KICAgICA8T3JkZXJJQYXJhbCA8T3JkZXJJQYXJhbCA8SW5zdHJ1bWVudElkPlBUT1RFQQk9FMDAxMj
wvSW5zdHJ1bWVudElkPg0KICAgICA8UXVhbnRpdHk+MDAwMDAwMDAwMDAwMDAwMDAwPC9RdWFudGl0eT4NCiAgICAgPFByaWNJe
AgICAgICAgIDxSZXF1ZXN0ZXJJcz4wSWQ+YwpwZXRlcIgnNFzEwNTQ2NTM1NDYwNDYgICAgICAgICAgICAgPC9SZXF1ZXN0ZXJJZD4N
CiAgICAgICAgICAgIDxJcXVlc3RJZD48L1JlcXVlc3RJZD4NCiAgICAgPFJlcXVlc3RTZXJ2aWNlPC9SZXF1ZXN0U2VydmljZT4N
CiAgICAgICAgICAgICAgIDx0aWNrZXRPcGVuT3JkZXJUaWNrZXRJbnB1dERhdGE+DQogICAgIDwvSW5wdXREYXRhPC90aWNrZXQ6
T3BIbk9yZGVyVGlja2V0U2VydmljZVJlcXVlc3Q+DQogICAgPC9zb2FwOmJvZHk+DQo8L3NvYXA6RW52ZWxvcGU+DQo8L0F1dGhl
bnRpY2F0aW9uU2VjdXJlRGF0YT4NCiAgICAgICAgICAgIDxpbnRlbnQ+T3BlbklyZGVyVGlja2V0U2VydmljZTwvaW50ZW50Pg0K
ICAgICAgICAgICAgPDtyYW5zYWN0aW9uSWQ+DQogICAgICAgICAgICAgICAgPHhtbDp0cmFuc2FjdGlvbklkPjEyMzQ1Njc4OTA8
L3htbDp0cmFuc2FjdGlvbklkPg0KICAgICAgICAgICAgPC90cmFuc2FjdGlvbklkPg0KPC9BdXRoZW50aWNhdGlvblNlY3VyZURh
dGE+
AgICAgICAgICAgIDxpbnRlbnQ+T3BlbklyZGVyVGlja2V0U2VydmljZTwvaW50ZW50Pg0K
1ja2VOU2VydmljZTwvaW50ZW50Pg==</AuthenticationSecureData>
        <intent>OpenOrderTicketService</intent>
    </SOAP-ENV:Header>
</SOAP-ENV:Envelope>
```

FIG. 5

```xml
<?xml version="1.0" encoding="UTF-8"?>
<SOAP-ENV:Envelope xmlns:SOAP-ENV="http://schemas.xmlsoap.org/soap/envelope/">
    <SOAP-ENV:Header>
        <AuthenticationViaPopup/>
        <intent>ExecuteOrderService</intent>
    </SOAP-ENV:Header>
    <SOAP-ENV:Body>
        <auto:ExecuteOrderService xmlns:auto="http://jpmorganexpress.jpmorgan.com/ns/fi/outright/auto/">
            <OrderParams>
                <InstrumentId>PTOTECOE0011</InstrumentId>
                <InstrumentIdType>ISIN</InstrumentIdType>
                <RequestId>ajpeters_flowbiz28_1054659495312_0</RequestId>
                <RequestType>Order</RequestType>
                <Timestamp>1054659495312</Timestamp>
                <Validity>Immediate</Validity>
            </OrderParams>
        </auto:ExecuteOrderService>
    </SOAP-ENV:Body>
</SOAP-ENV:Envelope>
```

Sample XML Request Message

FIG. 7

```
<?xml version="1.0" encoding="UTF-8"?>
<SOAP-ENV:Envelope xmlns:SOAP-ENV="http://schemas.xmlsoap.org/soap/envelope/">
    <SOAP-ENV:Header>
    </SOAP-ENV:Header>
    <SOAP-ENV:Body>
        <SOAP-ENV:Fault>
            <faultcode>Client.InvalidMessageBody</faultcode>
            <faultstring>Invalid message body. (Namespace of top element of service document not valid for this service: http://jpmorganexpress.jpmorgan.com/ns/fi/outright/auto/)</faultstring>
            <faultnumber>304</faultnumber>
        </SOAP-ENV:Fault>
    </SOAP-ENV:Body>
</SOAP-ENV:Envelope>
```

Sample XML Reply Message with Fault

FIG. 8

```
<?xml version="1.0" encoding="UTF-8"?>
<SOAP-ENV:Envelope xmlns:SOAP-ENV="http://schemas.xmlsoap.org/soap/envelope/">
    <SOAP-ENV:Header>
    </SOAP-ENV:Header>
    <SOAP-ENV:Body>
        <OrderStatusUpdate>
            <Status>New</Status>
            <NearDealtCcy>EUR</NearDealtCcy>
            <OrderNotional>10,000.00</OrderNotional>
            <OrderRate>6.754</OrderRate>
            <OrderType>No Worse Than</OrderType>
            <Validity>Immediate</Validity>
            <RemQty>0.00</RemQty>
            <NbFills>0</NbFills>
            <Account>All FXs</Account>
            <ClientFirm>QASharedTest</ClientFirm>
            <InstrumentID>EURUSD_SPOT</InstrumentID>
            <UserID>4618</UserID>
            <AltOrderID>ajpeters_flowbiz28_1054660077796_1</AltOrderID>
            <CreationDate>03 Jun 2003</CreationDate>
            <CreationTime>13:07:57</CreationTime>
            <APITradingIntent>Auto</APITradingIntent>
        </OrderStatusUpdate>
    </SOAP-ENV:Body>
</SOAP-ENV:Envelope>
```

Sample XML Asynchronous Reply Message

FIG. 9

```
<applet code="com.jpmorgan.flowbiz.client.applet.FbJPeXLinkCommunicationsApplet"
    name="jpexlink"
    codebase=" https://jpmorganexpress.jpmorgan.com/jpm/fb.libServer/"
    height=1 width=1 style="visibility: hidden;">
    <PARAM NAME="cabbase" VALUE="JPeXLinkApplet_JPEXClient.cab">
</applet>
```

FIG. 10

```
///Blah blah...
} else if ( a_req.getPathInfo().endsWith("JPeXLinkApplet_JPEXClient.cab") ) {
    if ( FbServletUtilities.getPersistantBooleanValue("jar",a_req,a_res) ) {
        strLibrary = "_JPEXClient.cab";
    } else {
        strLibrary = "_JPEXLinkApplet.cab";
    }
}
///Blah blah...
```

FIG. 11

```
public byte [ ] signMessage (
                int systemID,
                int principalID,
                byte [ ] payload,
                byte [ ] key)
```

FIG. 12

```
public VerifiedData verifyMessage (
                byte [ ] message,
                byte [ ] [ ] systemKeys,
                int principalID,
                long maxAge,
                long maxFuture)
```

FIG. 13

```
public class VerifiedData {
    int systemID;
    int principalID;
    int timestamp;
    byte [ ] payload;
}
```

FIG. 14

INTEGRATED TRADING PLATFORM ARCHITECTURE

CROSS-REFERENCE TO RELATED APPLICATIONS

This application claims the benefit of U.S. Provisional Application Ser. No. 60/476,416, "Integrated Trading Platform Architecture", filed Jun. 6, 2003, which is hereby incorporated herein by reference in its entirety.

FIELD OF THE INVENTION

This invention relates to the field of software architecture and, more specifically, to a system and method for integrating an architecture to facilitate interactive trading.

BACKGROUND OF THE INVENTION

Electronic trading of assets is becoming the rule, as opposed to the exception that it was a few short years ago. Many businesses offer one or more client applications for trading purposes. One such client is the JPeX client.

The JPeX client is a web-based, Java applet developed and offered by JPMorganChase to internal and external clients as part of the JP Morgan eXpress™ platform. JP Morgan eXpress™ is JP Morgan's premier electronic trading platform that effects trading across multiple asset classes and across multiple time zones. The platform provides a single point of access to JP Morgan's liquidity in major markets. Key functionality of the web client includes:

Continuous streaming prices on all instruments;
Configurable workspace including market watch and order screens;
Downloadable and exportable real time cross asset class trade blotters;
Dynamic Data Exchange (DDE) link to spreadsheets (i.e., Excel) with real-time prices on all instruments and automated trading functions;
Configurable trading default settings and user preferences; and
Straight through processing to settlement eliminating any manual intervention.

For securities trading, major functionality includes:
Service available throughout both the London and New York trading day;
Enhanced search function makes it easy to find instruments to monitor or trade;
Click-and-trade functionality with auto-acceptance to ensure execution times of less than two seconds;
Request for Quote functionality that allows the client to ask for different terms (e.g., larger sizes than those quoted on screen, irregular settlement location or irregular settlement date);
The option to leave subject orders at a particular level that is then subject to trader acceptance;
Automated hedge functionality when executing credit trades;
Multiple account trading—trades can be allocated to sub-accounts at trade inception;
Daily closing prices now available; and
Advanced "heat map" research tools with integrated click and trade functionality.

For foreign exchange trading, key functionality includes:
Streaming Rates provided for Spot and Swaps;
Ability for user to select pre-defined currency pair and to request a quote directly from a trader;
Trading offered during the London and New York day;
Ability to trade Spot, Matched and Mismatched Swaps with standard tenors, Forward outrights, Forward Forwards, Pre-spot outrights, Broken dated swaps, Pre-spot swap; and
Ability for a user to define any currency pair and submit for request for quote.

The JPeX system is described in the following patents and patent applications: U.S. patent application Ser. No. 10/026,403, entitled "System and Method for Single Session Sign On," by Lawrence Miller and Martin Trenholm, filed Dec. 21, 2001; U.S. patent application Ser. No. 10/078,687, entitled "System and Method for Single Session Sign-On Management Without Central Server," by Lawrence Miller and Bruce J. Skingle, filed Feb. 15, 2002; U.S. patent application Ser. No. 10/064,118, entitled "Method and System of Delayed Cookie Transmission In a Client Server Architecture," by Mike Moore, Lawrence Miller and William Deans, filed Jun. 12, 2002; U.S. patent application Ser. No. 10/064,221, entitled "Method and System for Determining Receipt of a Delayed Cookie In a Client Server Architecture," by Mike Moore, Lawrence Miller, William Deans and Roman Sulzhyk, filed Jun. 21, 2002; U.S. patent application Ser. No. 10/256,598, entitled "A System and Method for Online Trading Using an Electronic Spreadsheet," by Brian Lynn and Lawrence Miller, filed Sep. 25, 2002; U.S. patent application Ser. No. 10/065,337, entitled "Data Element Change Across Multiple Instances of Data Base Cache," by David Chapman, Mike Moore, Lawrence Miller, Zhengrong Chiu, Andy Pertserson and Hansen Wang, filed Oct. 4, 2002; and U.S. patent application Ser. No. 10/412/886, entitled "Network Based System For Initiating Or Executing Financial Transactions," by Lee McGinty, Lawrence Miller, Silvio Oliviero, Brian M Pasierb, Paulo Rodela and Tamara Sablic, filed Apr. 14, 2003; all of which are assigned to the assignee of this patent application and all of which are incorporated by reference in their entirety.

Thus, the JPeX client applet offers a rich set of business logic rules for order submission embedded in its code and its GUI's. Increasingly, efforts are underway to integrate other applications, external to JPeX, with this functionality. To date, the JPeX client has been integrated with a Dynamic Data Exchange (known in the art as "DDE") server, a JavaScript/HTTP API for opening market watch windows and credit map windows. The JPeX client has also been integrated with a prototype of click-to-trade API, based on JavaScript and HTTP.

All integration efforts to date have proceeded independently of one another. The choice of technologies and solutions has left an increasingly chaotic jumble of specialized code in the JPeX client.

SUMMARY OF THE INVENTION

A system and method that allows software running on a JPeX client system to open a socket on which it listens for connections from the local host. External applications on the desktop are able to connect to the server socket in the JPeX client and use XML to execute commands on the client, for the purpose of initiating end-user interaction activities and workflows, such as those related to trade entry.

In accordance with one aspect of this invention, an applet is executed on a computer for interfacing with multiple client programs that are also executing on the computer. The applet is initiated by a browser-based application executing on the computer. The applet comprises a socket server configured to establish a server socket on a port and receive a connection request via the port from at least one of the multiple client programs. The socket server is also configured to open a socket connection on a different port for communicating with the at least one of the multiple client programs in response to the received connection request. Additionally, the socket server receives a service request on the different port from the at least one of the multiple client programs after the socket connection is opened and outputs the received service request as a passed-on service request.

This aspect of this invention further includes a translation facade configured to receive the passed-on service request outputted from the socket server and parse the passed-on service request, thereby generating a parsed service request if the passed-on service request complies with predetermined rules. The translation facade is also configured to reject the passed-on service request if the passed-on service request does not comply with the predetermined rules and output the parsed service request if generated.

Further, this aspect of this invention includes a processing system configured to receive the parsed service request from the translation facade and process the parsed service request.

Advantageously, the applet further comprises an authentication module configured to authenticate the socket connection after the socket server opens the socket connection.

A method according to another aspect of this invention is for use as an applet initiated by a browser-based application in a computer that interfaces with multiple client programs executing on the computer. The method includes establishing a server socket on a port, receiving a connection request via the port from at least one of the multiple client programs, and opening a socket connection on a different port for communicating with the at least one of the multiple client programs in response to receiving the connection request. The method also includes receiving a service request on the different port from the at least one of the multiple client programs after opening the socket connection and parsing the received service request to generate a parsed service request if the received service request complies with predetermined rules. If the received service request does not comply with the predetermined rules, the received service request is rejected. Otherwise, the parsed service request is processed.

BRIEF DESCRIPTION OF THE DRAWINGS

A more complete understanding of this invention may be obtained from a consideration of this specification taken in conjunction with the drawings, in which:

FIG. 2 is an authentication header as used in the architecture of FIG. 1;

FIG. 4 is a sample message to be sent to the JPeX applet of FIG. 1;

FIG. 5 is a MAC of the sample message of FIG. 4;

FIG. 7 is a sample XML request message;

FIG. 8 is a sample XML reply message with a fault;

FIG. 9 is a sample XML asynchronous reply message;

FIG. 10 is an HTML applet tag for use by $3^{rd}$ party web sites;

FIG. 11 is a deployment cookie controlled library selection code in accordance with an exemplary embodiment of this invention;

FIG. 12 is a method to generate a signed message;

FIG. 13 is a message validation method; and

FIG. 14 is a verified data object according to an exemplary embodiment of this invention.

DETAILED DESCRIPTION

I. Overview

Figure 1:
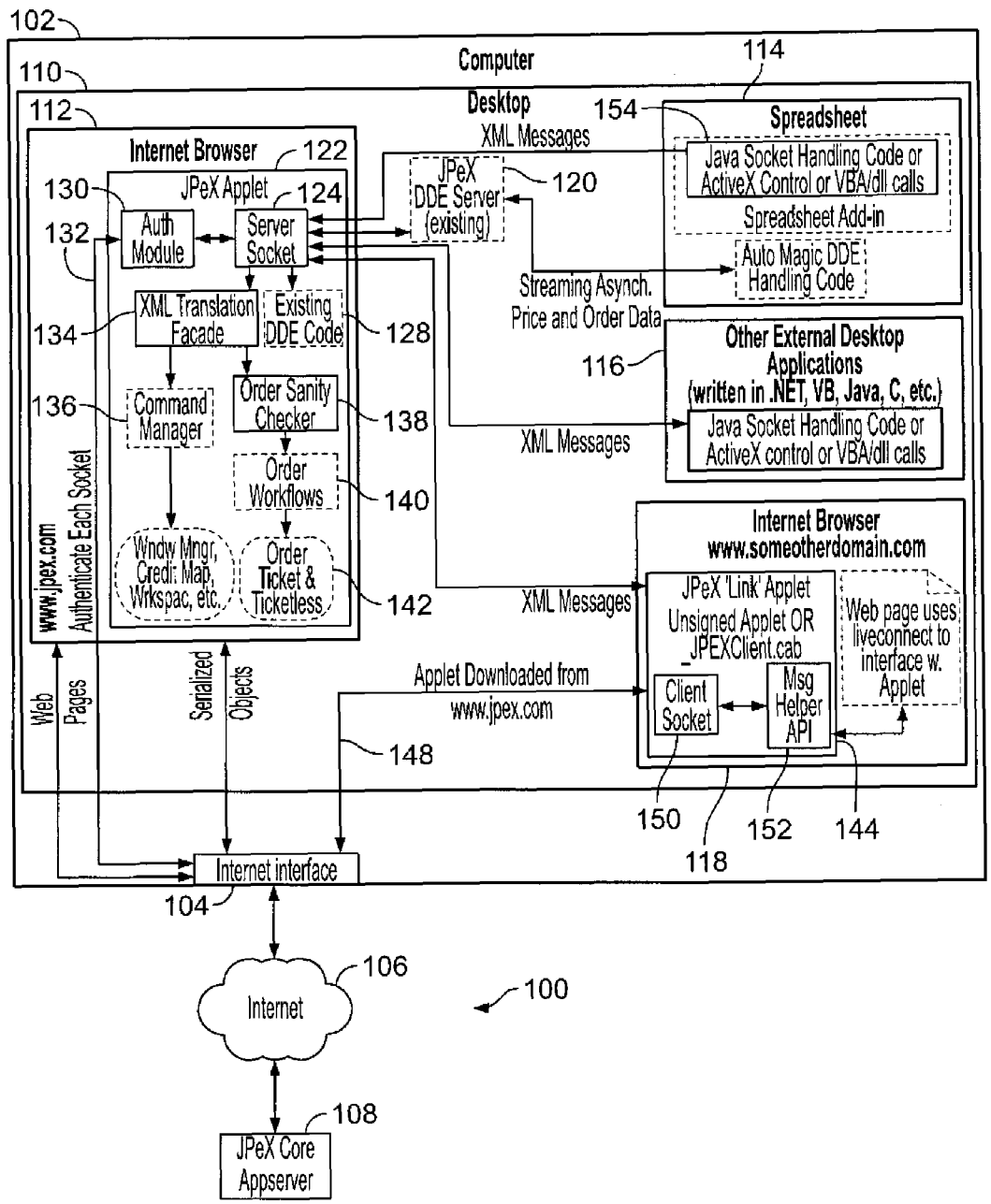
FIG. 1 is a block diagram of a high-level overview of an architecture according to an exemplary embodiment of this invention.

As stated above, this solution for desktop integration centers on using a socket for the communications transport and XML for the messaging format. FIG. 1 illustrates a high-level overview of an architecture according to an exemplary embodiment of this invention, shown generally at 100. New logical components are shown in heavy block lines. Modified logical components are shown in dashed outline. Extant logical components that are not modified by this architecture are shown in dotted outline.

According to this exemplary embodiment, there are three main physical components in this high level overview 100. A computer 102 is connected via an internet interface 104 (operating within computer 102) to the Internet 106. Internet 106 passes data between Internet interface 104 of computer 102 and an application server 108. Application server 108 is illustrated herein as a JPeX core appserver, in accordance with one aspect of this invention. While this invention is described in terms of using the Internet 106 as a data transmission medium, one skilled in the art will appreciate that any data network, public or private, can be employed without departing from the scope of the appended claims. Furthermore, one skilled in the art will appreciate that computer 102 may be a personal computer, laptop, workstation or any other such device without departing from the scope of the appended claims.

In accordance with this exemplary embodiment, a desktop 110, as is known in the art, is operating on computer 102. There are four applications running on desktop 110 that are relevant to this exemplary embodiment: a first instance of an Internet browser 112, a spreadsheet application 114, other external desktop applications 116 and a second instance of an Internet browser 118. Further, a JPeX DDE server 120 is also operating on computer 102 in a manner previously described in the art, and therefore is not further discussed.

According to this exemplary embodiment of this invention, when Internet browser 112 is initialized, it starts a JPeX applet 122. JPeX applet 122 now starts a server socket 124 on a given port. In accordance with this exemplary embodiment, server socket 124 services requests via XML messages. One skilled in the art will realize that the server socket may also service existing DDE socket 128 requests and be able to make such modification, after reading this specification.

Each server socket 124 connection that is opened from a client is authenticated by authentication module 130. This authentication involves a round-trip message 132 to JPeX core appserver 108 via Internet interface 104 and Internet 106. Once authorized, the server socket 124 is free to communicate.

Server Socket 124 delegates XML service requests to a translation facade 134. This logical unit helps to parse the XML, provides some basic sanity checking on the XML and translates the XML into an appropriate action within the JPeX client API 122. Many simple commands are delegated to the existing string-based command mechanism in a command manager 136 for performing simple commands such as opening market watch windows, opening the credit map or opening the workspace.

XML translation facade 134 may hand off more complex requests to a specialized execution engine, as will be the case for order submission. For order submission, a new order parameter sanity checker 138 ensures that the basic order request data is properly formed and reasonable. Order sanity checker 138 forwards the request to the existing workflow engines 140 for processing the order creation request. The order workflows 140 then either directly submit the order or create a new ticket 142.

Outside of the JPeX applet 122, some new pieces are shown in accordance with this exemplary embodiment. For integration with other web sites, such as applet/web page integration, a new applet, the JPeX Link Applet 144, provides communication with server socket 124. For those users that download and install the signed applet code base 122, a small unsigned applet 148 will need to be downloaded from JPeX core Appserver 108. This applet will use code that is part of the signed JPeX client code base 122 to open a connection to the already running JPeX applet 122.

The JPeX link applet 144 comprises a method that takes a string in as an argument (that contains XML) which is passed to the client for processing and returns a string value. Optionally, helper functions or libraries may be provided to help integrators build the XML documents automatically. Communication with JPeX client applet 144 is encapsulated in a new client socket 150 module and a message helper API 152. These modules are distributed with the signed client class files.

In this manner, integrators hoping to use JPeX link applet 144 simply need to embed an applet tag in their page that loads the JPeX link applet 144 from JPeX core appserver 108. They could then use liveconnect to issue commands in javascript to the applet.

Outside of the JPeX applet 122, changes also need to be made for integration into spreadsheet application 114. In this exemplary embodiment, integration with Excel is described. One skilled in the art will appreciate how to integrate this invention with other applications after studying this specification.

The Excel interface currently uses DDE. This is the correct technology for streaming real time market data and order updates and is thus untouched. The current Excel interface also uses DDE requests to submit orders. This functionality is replaced with an Excel java socket handling code 154, which makes connections to JPeX applet 122 and submits XML message requests. Java socket handling code 154 may comprise:

1. Using VBA socket logic or win32 API to make low level calls;
2. using an ActiveX control/COM object to handle communications; or
3. a new Java class using Java Monikers.

II Changes to JPeX Applet 122

The following section goes into more detail about the areas in the JPeX applet 122 that require new modules or changes to develop this proposed solution.

II A Socket Server 124

According to this exemplary embodiment of this invention, JPeX applet 122 includes code to provide a multi-threaded socket server 124, which establishes a server socket (as is known in the art and therefore not further discussed) on a given port and listens for in-coming connection requests. In this exemplary embodiment, a new port that is separate from the DDE server port is selected.

Advantageously, the start listen port is configurable by user preferences. (It is recommended that the current DDE port, 5000, is not used because that port appears to be problematic on Windows XP). No matter what port is selected, if binding fails, an attempt is made to bind to the next highest port number over a series of ports (e.g., 5354-5374). Socket server 124 should report on the port that it binds to. Client programs connecting need to follow a similar protocol (that is, attempt to connect to port 5354, if this fails, connect to the next highest port over the same range).

When a socket connection is opened from socket server 124, it will immediately need to be authenticated before it can be used for general communications or each message arriving will need to be authenticated via a MAC of the sensitive data (the MAC can be immediately verified or passed onto the server for deferred verification). Socket server 124 can delegate this work to authentication module 130.

Socket communication can take place in one of two modes: synchronous or asynchronous. In synchronous mode, the pattern of connecting client-JPeX Applet (server) communication will always be request-reply-request-reply-etc. In asynchronous mode, a given request initiates one or more asynchronous replies on a given established socket connection.

II A 1 Wire Format

The wire format for communicating with socket server 124 requires that, when the socket connection is established, the socket server 124 sends down a handshake data message and the client must immediately reply with a handshake data message of its own. If the handshake fails, the socket server 124 terminates the socket connection.

The byte format of the handshake for both the socket server 124 and the client is:

1. Handshake Length—4 byte integer (this is the length of everything that follows, not including this field)
2. System Name—String/Char data, ASCII Encoded, according to the Java-endian rules.
3. System Id—4 byte int
4. Major Version Id—2 byte short
5. Minor Version Id—2 byte short
6. Connection Mode—1 byte short Once handshaking is successfully performed, messages can be sent from the connecting client and replies will be sent back from the JPeX applet (server). The byte format for the messages for both the server and the client are:

1. Header Length—4 byte integer (This is the length of the entire header (this field and the next 3 fields))
2. Body Length—4 byte integer (This is the length of the body which is placed at the end)
3. Client Message Id—8 byte long (high bits first)
4. Server Message Id—8 byte long (high bits first)
5. Body content in UTF encoding. The length as specified by the header.

II B Authentication Module

All socket connections are authenticated before other communication can commence on the socket or the content of each message must be secured by a cryptographic MAC. Whenever a message is sent over an un-authenticated connection without authentication credentials or with bad authentication credentials, the server will reply with a message that contains the following authentication header of FIG. 2.

Currently, four authentication modes are supported:

1. Clear text username/password. The client sends an authentication header that contains the username/password. The username/password are sent as clear text but only over the loop back address which is always implemented as an in-memory RPC on operating systems, so the information never traverses the network. The username/password combination is sent from JPeX applet 122 to the JPeX core appserver 108 for validation. If the combination passes validation, the socket connection will be put into an authenticated state and all further traffic on the socket will be accepted. Otherwise, a challenge message as shown in FIG. 2 will be sent back to the client. To use this authentication mode, a header should be included with a SOAP request to the JPeX applet 122. The header has the following format:

```
<AuthenticationViaUsernamePassword
username="fbtrader48" password="abc" force="true"/>
```

The "force" attribute can be omitted. It can be set to true if forced re-authentication is desired (n.b., the connection is placed into authenticated mode once it is successfully authenticated).

Figure 3:
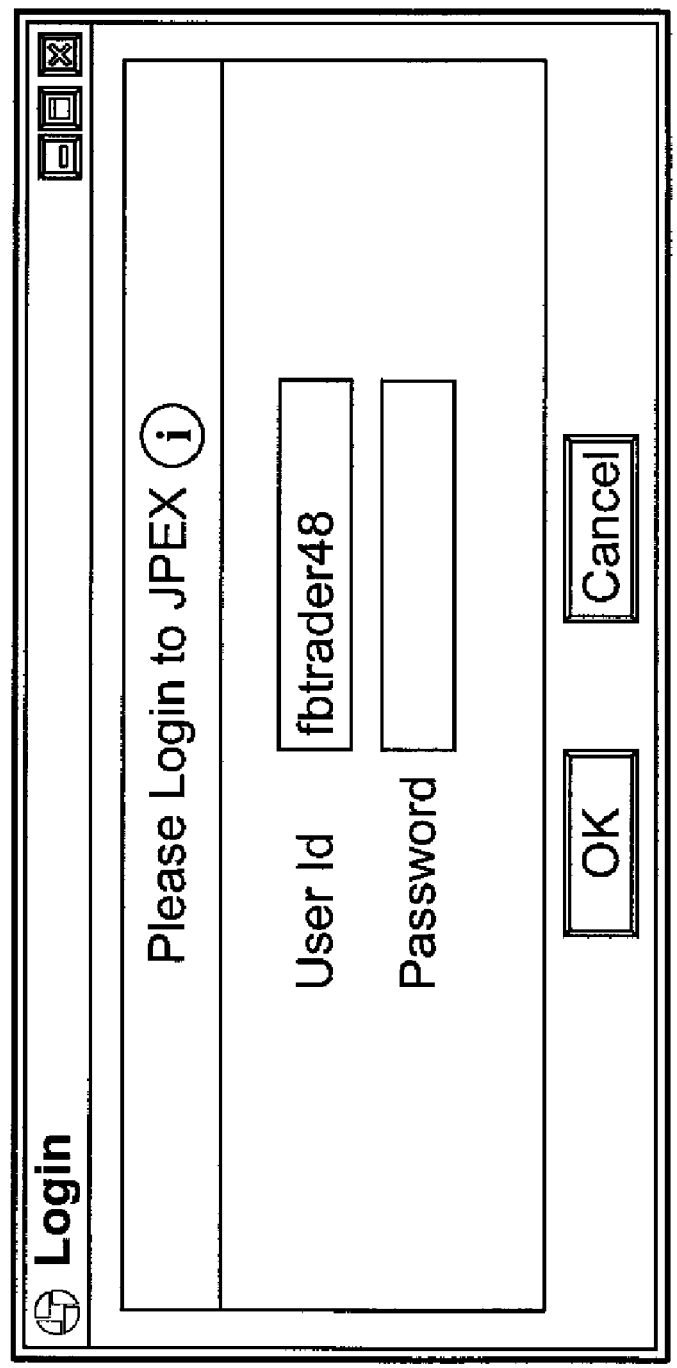
FIG. 3 is a screen shot of an "On-Behalf-Of" authentication pop-up dialog box.

2. On-Behalf-Of Authentication. In this mode, the connecting client asks the JPeX applet to authenticate the connection. When this mode of authentication is requested, the JPeX applet 122 displays the following username/password dialog of FIG. 3. The username/password combination is sent down from the JPeX applet 122 to the JPeX core appserver 108 for validation. If the combination passes validation, the socket connection will be put into an authenticated state and all further traffic on the socket will be accepted. Otherwise, a challenge message as shown in FIG. 2 will be sent back to the client. To use this authentication mode, a header should be included with a SOAP request to the JPeX client. The header has the following format:

```
<AuthenticationViaPopup force="true"/>
```

The "force" attribute can be omitted. It is set to be true to force re-authentication (remember that the connection is placed into authenticated mode once it is successfully authenticated).

3. Private Key Nonce-Based Challenge-Response. In this mode, the connecting client uses the contents of the "Nonce" element in the authentication reply header (sent from the JPeX applet 122) and generates a MAC. The MAC combines the nonce data, and a system id using a private key. The MAC data is sent back as the contents of a "Challenge-Response" element. When the JPeX applet 122 then receives the Challenge-Response element, it passes the contents down to the JPeX core appserver 108 for authentication. If the combination passes validation, the socket connection will be put into an authenticated state and all further traffic on the socket will be accepted. Otherwise, a challenge message as shown in FIG. 2 will be sent back to the client. To use this authentication mode, a header should be included with a SOAP request to the JPeX client. The header has the following format:

```
<ChallengeResponse force="true"> 6n21FvzE35NCbJoUHBiHXoIhnto=
</ChallengeResponse>
```

The "force" attribute can be omitted. It is set to "true" to force re-authentication (remember the connection is placed into authenticated mode once it is successfully authenticated).

4. Message MAC. In this mode, a cryptographic MAC of the data being passed down as the payload of the message is generated every time and included with the data. This mode serves to verify the authentication of each message, but is not enough to place the entire connection into an authenticated state. The check of the MAC can be performed immediately by having the JPeX applet 122 send the MAC to the JPeX core server 108 for verification or can be deferred (for expediency sake) until the server actually processed the MAC-ed data. To use this authentication mode, a MAC needs to be taken of the message body. For example, the message of FIG. 4 may be sent to the JPeX applet. Note that the message is an envelope that contains a header and a body section. When a MAC of the message is sent, in what would be the body of the message, a MAC calculation of it is made and that MAC is sent as a header as in FIG. 5. A further description of an HMAC authentication mechanism is given in section VII, below.

In all events, all socket connections need to be initially validated. Once validated, all traffic that passes over them is permitted or an individual MAC of the data being sent needs to be calculated and shipped with every request.

II C XML Translation Facade 134

Once a server socket 124 is validated, all message interpretation and command execution is handed off to XML translation facade 134. The job of XML translation facade 134 is to parse XML messages and provide initial validation. XML translation facade 134 rejects messages that fail using a set of well known SOAP fault messages and codes. Once the data has been parsed into a SOAP Envelope structure, XML translation facade 134 then delegates the command for processing to either one of the many existing workflow/command execution API calls in the client 122, to a new order submission or to order ticket workflow 140, 142. XML translation facade 134 also formulates an XML response based on the result of the method invocation and returns that to the socket server for processing.

II D Order Sanity Checker 138

For order processing initiated from requests from the socket server, a new component, the order sanity checker 138, is added to help validate the "form" and "sanity" on incoming order requests.

Integration units such as the Click-To-Trade API, or the current DDE implementation submit order requests (either to open an order ticket or to directly submit an order to the core) that will only have a bare minimum of information present to populate the order. The order sanity checker 138 logical component assesses whether the information passed in from these external integrating applications is enough and of the correct format to place an order or open an order ticket.

The order sanity checker 138 component is comprised of several actual parts. They are:

1. Schema Validation Code. Incoming order submission requests and order ticket requests are checked against publicly available JPeX schema. These XML schemas describe the format of the XML data that must be passed into JPeX Applet 122 in order to either submit an automatic trade or to open an order ticket. The custom validation layer works by parsing the schemas on JPeX core appserver 108 into runtime checking objects. The runtime checking objects are then sent to the JPeX applet 122 where they are used to evaluate hash tables of data.

The hash tables of data that they evaluate contain the input parameters from requests made via the JPeX client trading integration API. The schema validation helps check the presence/absence of required data fields, relationships among the keys and the type of data contained in the requests.

2. Sparse Order Validation. Further checks are applied on inbound hash table data. This code can also check the presence/absence of required data fields. In addition, it also checks the request data for the more sophisticated data relationships that are mandated by the different trading models embodied in the JPeX applet 122. It also helps to standardize and normalize the request data into a format suited for processing on the existing JPeX applet 122 and JPeX core appserver 108.

II E Order Workflows 140

Order submission and order ticket creation in JPeX applet 122 are driven by a workflow engine 140. In order to support automatic order submission and order ticket opening from this integration API, the existing workflows were augmented to encompass the above-mentioned order sanity checker 138 logical component. Changes in the order workflow 140 also were made to include the work done for the next section.

II F Order Ticket Display for sparsely populated Orders

Figure 6:
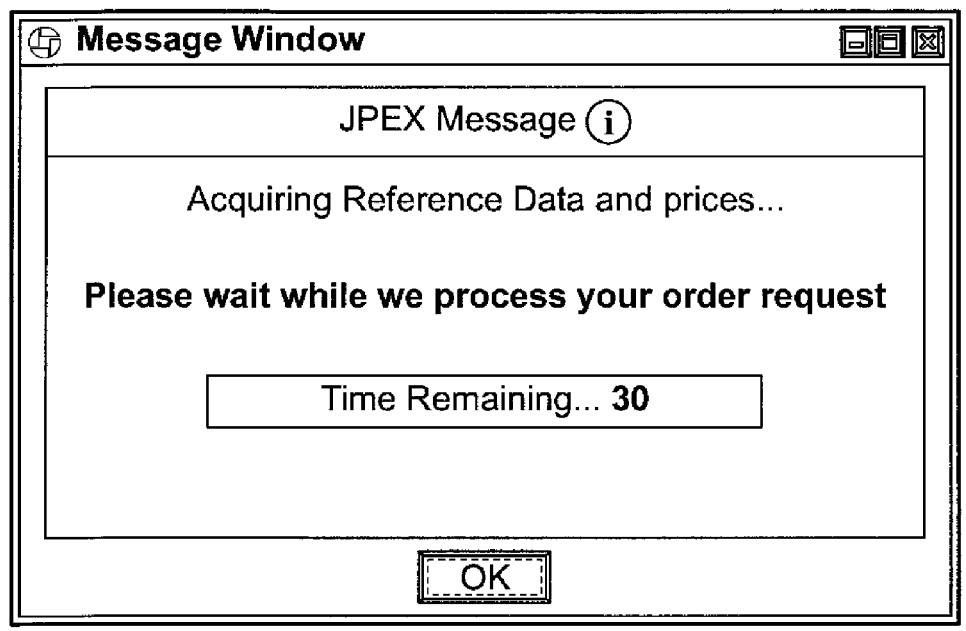
FIG. 6 is a sample order processing pop-up window.

FIG. 6 illustrates a sample order progress window. This window has a timer bar indicating the expected time left to complete opening the order ticket on the bottom. There is a message on the top to provide users with feedback. The workflows asynchronously update the contents of this window and also close it when the workflows are finished and the GUI order ticket is ready to be displayed.

III Excel Integration

As mentioned above, Excel currently uses a DDE implementation to receive market data and order data updates. This is the correct use of this technology and should not be changed. However, all synchronous communications with the JPeX client applet should be changed to use the new socket connection/XML parsing mechanism.

There are several ways to handle the connectivity to the JPeX client. In accordance with an exemplary embodiment of this invention, the Java code in the "client link socket" module described above is re-used to connect to the applet in the VBA code that makes up the plug-in for Excel that is distributed as part of JPeX. Basically, when the JPeX link is installed, if the Java code for the client link socket module is included, it can be registered and invoked from within VBA using a mechanism called Java Monikers.

IV Assumptions

This solution is based on the assumption that the JPeX client is already up and running. Error handling is provided if the JPeX client is not up and running.

V HMAC Authentication Mechanism

The purpose of section V is to explain the design of the HMAC API Authentication API, which is used to provide application security for the Desktop Integration Interface.

This section includes the following information:

Explanation of rationale and design of the authentication mechanism

Cryptographic operations used by the authentication mechanism

Detailed data format

Definition of API interfaces

V A Design Overview

The Desktop Integration Interface (DII) offers developers a number of different authentication mechanisms, including username/password-based schemes, an authentication-delegation scheme, and a cryptographic authentication mechanism. This section specifically addresses the cryptographic authentication mechanism.

The DII uses a socket-based communications protocol to allow $3^{rd}$ party applications to communicate with JPeX applet 122. The types of communications passed over the interface include:

Requests for the applet to open pre-populated order tickets on the client's screen;

Requests for the applet to send orders to the JPeX core appserver 108 without user confirmation; and Updates on orders that the user is entitled to view.

These types of operations are, in general, sensitive in nature. Because the DII only allows connections from the client's local machine, anyone connecting to the interface needs to already have access to the user's machine. Additionally, because the connection is made over the loop-back interface, transport level security is not an issue because the connection does not traverse a network (e.g. although the connection is socket-based, it is simply being used as an inter-process communications mechanism).

Nonetheless, it is important to ensure that the interface has a reasonably strong authentication mechanism for two reasons. First, the interface must be protected against accidental cross-connections on multi-user machines (such as Citrix servers), and second, to provide a second line of defense in case a client's machine permits multi-user logins. Of course, no authentication mechanisms can protect this interface (or any interface) if the client's local user account is compromised.

In general, the cryptographic authentication mechanism is intended to provide an authentication mechanism for use by $3^{rd}$ party applications building integrated offerings that provide some form of trading integration. Typically, these systems will use the DII to pop-up trading tickets for JPeX core appserver 108 users. The authentication mechanism assumes that the $3^{rd}$ party servers are synchronized to an accurate time source (for instance via NTP).

V B General Message Flows

When a $3^{rd}$ party application connects to the JPeX DII, a handshake process is initiated. Generally the flow of the process is as follows:

1. $3^{rd}$ party server generates an authentication message, and sends it over a secure network link to the $3^{rd}$ party software package running on the client machine.
2. The $3^{rd}$ party software package opens a socket connection to the JPeX applet 122 DII socket, and sends the authentication message as part of the initial authentication handshake in the DII protocol.
3. JPeX applet 122 receives the authentication message and sends it to the JPeX core appserver 108 for authentication.
4. The JPeX core appserver 108 validates the authentication message and sends a "YES" or "NO" message to the JPeX applet 122.
5. Assuming the message was successfully validated, the connection is put into "authenticated" mode and the applet will then process requests.

V C Cryptographic Authentication Mechanism

The authentication mechanism is based using an RFC-standard HMAC message authentication code with the SHA1.1 hash algorithm, using a 128-bit (16-byte) secret key. The HMAC algorithm takes in an arbitrary length message and, using the keying data, produces a 160-bit authentication code.

In order to verify the connection, the data of Table I is used in the HMAC calculation:

TABLE 1

| Field Name | Type | Description |
|---|---|---|
| Version | 32-bit signed integer (4 bytes) | The version number of the authentication message format. |
| System ID | 32-bit signed integer (4 bytes) | An identifier representing the $3^{rd}$ party system which generated the authenticator. This is used to determine which key should be used to validate the HMAC. |
| Principal ID | 32-bit signed integer (4 bytes) | The user's principal ID. This is used to ensure that a token generated for one user cannot be used to authenticate another user. |
| Timestamp | 64-bit signed integer (8 bytes) | The time in milliseconds that the authenticator was generated, using the standard Unix time epoch. Used to ensure that a token can only be used for a limited lifetime. |
| Payload Size | 32-bit signed integer (4 bytes) | The size of the attached message payload, if any |
| Payload | Obscure byte array | An optional message payload |

All integers are stored in network byte order.

The validation process involves the following checks, all of which must pass in order for the message to be considered authentic:
1. The system ID must be valid.
2. The HMAC computed using the key known to correspond to the system ID claimed in the message must match the HMAC included in the authentication mechanism.
3. The principal ID in the message must match that of the JPeX user.
4. The timestamp must be within a permissible range (i.e. less than X milliseconds in the past, and less than Y milliseconds into the future; typically X would be a few minutes, and Y would be a minute or so).

V D Message Format

The message format of Table II is used in generating the HMAC:

TABLE II

| Version | System ID | Principal ID | Timestamp | Payload Size | Payload |
|---|---|---|---|---|---|

This set of data is referred to below as the Verified Data. The size of this data is at least 24 bytes (depending on the size of the payload).

Once the HMAC is computed, it is appended to the Verified Data, as shown in Table III, to generate the complete authenticated data package:

TABLE III

| Verified Data | HMAC |
|---|---|

The size of the HMAC is 160 bits (20 bytes), so the total size of the authenticator is at least 44 bytes.

V E Programming Interfaces

The authentication API uses the following Java interfaces.

V E 1 Signing a Message

The method of FIG. 12 generates a signed message, including the Verified Data and HMAC, packaged as a byte array.

The inputs to this method are:
systemID: The numerical System ID assigned to the system generating the authenticated message.
principalID: The principal ID of the user
payload: The payload to be included in the message, if any (null signifies no payload)
key: The secret key assigned to the system generating the message.

In general, the resulting byte array will be base 64-encoded by the caller and sent in an authentication message to the client.

V E 2 Validating a Message

To validate a message, the method of FIG. 13 is used.

The inputs to this method are:
message: The message to be validated.
systemKeys: An array of 16-byte keys, each corresponding to the System ID of the key's array index.
principalID: The principal ID of the user session which received the message.
maxAge: The maximum age of timestamps to accept (in milliseconds).
maxFuture: The maximum amount of time into the future that will be accepted (in milliseconds)

The method either returns a VerifiedData object, if the data is successfully verified, or it returns a null if the data is not successfully validated. The composition of the VerifiedData object is illustrated in FIG. 14.

It is to be understood that the above-described embodiment is merely illustrative of the present invention and that many variations of the above-described embodiment can be devised by one skilled in the art without departing from the scope of the invention. It is therefore intended that such variations be included within the scope of the following claims and their equivalents.

What is claimed is:

1. A computer configured to interface with multiple client programs, comprising:
   a first applet capable of being initiated by a browser-based application, the first applet comprising:
   (a) a socket server configured to perform actions comprising:
      (i) establishing a server socket on a port,
      (ii) receiving a connection request via the port from at least one of the multiple client programs stored on the computer,
      (iii) opening a socket connection on a different port for communicating with the at least one of the multiple client programs in response to the received connection request, wherein the at least one of the multiple client programs is a second applet that provides an interface between the browser-based application and the socket server,
      (iv) receiving a service request on the different port from the at least one of the multiple client programs after the socket connection is opened, wherein the service request has a string message format, and
      (v) outputting the received service request to a translation façade;
   (b) the translation facade configured to perform actions comprising:
      (i) receiving the service request outputted from the socket server,
      (ii) parsing the service request, thereby generating a parsed service request, if the service request complies with predetermined formatting rules, (iii) rejecting the service request if the service request does not comply with the predetermined formatting rules, and
(iv) outputting the parsed service request if generated; and
(c) workflow engine configured to perform actions comprising:
(i) receiving the parsed service request from the translation façade, and
(ii) processing the parsed service request.

2. The computer according to claim 1, wherein the first applet further comprises an authentication module configured to perform actions comprising authenticating the socket connection after the socket server opens the socket connection.

3. The computer according to claim 1, wherein at least one of the multiple client programs is a spreadsheet application.

4. The computer according to claim 1, wherein the socket server is configured to perform actions further comprising:
transmitting a handshake data message to the at least one of the multiple client programs after opening the socket connection; and
terminating the socket connection when a proper reply to the handshake data message is not received.

5. The computer according to claim 1, wherein the translation facade parses the service request into a SOAP Envelope structure.

6. A system for integrating programs executing on a computer, the system comprising:
a computer:
(1) multiple client programs stored on a memory of the computer; and
(2) a first applet stored on the memory of the computer initiated by a browser-based application executing on the processor of the computer, the first applet comprising:
(a) a socket server computer module configured to perform actions comprising:
(i) establishing a server socket on a port,
(ii) receiving a connection request via the port from the at least one of the multiple client programs,
(iii) opening a socket connection on a different port for communicating with the at least one of the multiple client programs in response to the received connection request, wherein at least one of the multiple client programs is a second applet that provides an interface between the browser-based application and the socket server computer module,
(iv) receiving a service request on the different port from the at least one of the multiple client programs after the socket connection is opened, wherein the service request has a string message format, and
(v) outputting the received service request to a translation façade module;
(b) the translation façade computer module configured to perform actions comprising:
(i) receiving the service request outputted from the socket server,
(ii) parsing the service request, thereby generating a parsed service request, if the service request complies with predetermined formatting rules,
(iii) rejecting the service request if the service request does not comply with the predetermined formatting rules, and
(iv) outputting the parsed service request if generated; and
(c) a workflow engine computer module configured to perform actions comprising:
(i) receiving the parsed service request from the translation facade and
(ii) processing the parsed service request.

7. The system for integrating programs according to claim 6, wherein the first applet further comprising comprises an authentication module configured to perform actions comprising authenticating the socket connection after the Socket server opens the socket connection.

8. The system for integrating programs according to claim 6, wherein at least one of the multiple client programs is a spreadsheet application.

9. The system for integrating programs according to claim 6, wherein the socket server computer module is configured to perform actions further comprising:
transmitting a handshake data message to the at least one of the multiple client programs after opening the socket connection; and
terminating the socket connection when a proper reply to the handshake data message is not received.

10. The system for integrating programs according to claim 6, wherein the translation façade computer module parses the service request into a SOAP Envelope structure.

* * * * *